(12) United States Patent
Fargas et al.

(10) Patent No.: US 8,510,085 B2
(45) Date of Patent: Aug. 13, 2013

(54) METHOD OF CONSTRUCTING A DIGITAL MODEL OF A ROUTE

(75) Inventors: Thierry Fargas, Nice (FR); Dominique Clarac, Nice (FR)

(73) Assignee: Nodbox, Biot (FR)

( * ) Notice: Subject to any disclaimer, the term of this patent is extended or adjusted under 35 U.S.C. 154(b) by 720 days.

(21) Appl. No.: 12/446,660

(22) PCT Filed: Oct. 22, 2007

(86) PCT No.: PCT/EP2007/061267
§ 371 (c)(1),
(2), (4) Date: Apr. 22, 2009

(87) PCT Pub. No.: WO2008/049800
PCT Pub. Date: May 2, 2008

(65) Prior Publication Data
US 2010/0004903 A1     Jan. 7, 2010

(30) Foreign Application Priority Data
Oct. 23, 2006 (FR) ..................................... 06 09275

(51) Int. Cl.
*G06F 7/00* (2006.01)
*G06F 17/00* (2006.01)
*G06F 19/00* (2006.01)

(52) U.S. Cl.
USPC .................................. 703/6; 701/59; 701/400

(58) Field of Classification Search
USPC ....................... 703/6; 701/59, 400
See application file for complete search history.

(56) References Cited

U.S. PATENT DOCUMENTS

| | | | | |
|---|---|---|---|---|
| 6,487,500 | B2* | 11/2002 | Lemelson et al. | ............ 701/301 |
| 6,526,352 | B1* | 2/2003 | Breed et al. | .................... 701/470 |
| 7,447,593 | B2* | 11/2008 | Estkowski et al. | ............ 701/301 |

(Continued)

FOREIGN PATENT DOCUMENTS

| EP | 1 098 168 | 5/2001 |
|---|---|---|
| EP | 1098168 A2 * | 5/2001 |

(Continued)

OTHER PUBLICATIONS

Ali Asadian, Non Patent Publication "Optimized Data Fusion in an Intelligent Integrated GPS/INS System Using Genetic Algorithm", 2005.*

(Continued)

*Primary Examiner* — Omar Fernandez Rivas
*Assistant Examiner* — Angel Calle
(74) *Attorney, Agent, or Firm* — Young & Thompson

(57) ABSTRACT

A method of constructing a digital model of a road, includes the steps of acquiring a first set of data relating to the geometry of the road via a differential global positioning system (DGPS), acquiring a second set of data relating to the geometry of the road via a hybridized inertial unit with a global positioning system (GPS), indexing the values of the first and second sets of data by determining their confidence level, discarding the values of the first and second sets of data below a predefined confidence level in order to obtain a first and second set of corrected data, and aggregating the data of the first and second sets of corrected data in order to obtain the digital model of the road. The applicable to the fields of road cartography for navigation and road management, for the creation of adaptive localized algorithms.

20 Claims, 9 Drawing Sheets

(56) References Cited

U.S. PATENT DOCUMENTS

| | | | |
|---|---|---|---|
| 2007/0052555 A1* | 3/2007 | Ibrahim | 340/990 |
| 2007/0087756 A1* | 4/2007 | Hoffberg | 455/450 |
| 2012/0197464 A1* | 8/2012 | Wang et al. | 701/2 |

FOREIGN PATENT DOCUMENTS

| | | |
|---|---|---|
| EP | 0940654 B1 | 6/2005 |
| JP | 2000074669 A | 3/2000 |
| JP | 2000241179 A | 9/2000 |
| JP | 2006170970 A | 6/2006 |
| WO | 9823918 A1 | 6/1998 |

OTHER PUBLICATIONS

Seth Rogers, "Creating and Evaluating Highly Accurate Maps with Probe Vehicles", 2000.*

Francois Caron, Non Patent Publication "GPS/IMU Data Fusion using Multisensor Kalman Filtering: Introduction of Contextual Aspects", Jul. 2004.*

S. Syed, NPL, "Three Dimensional Fuzzy Logic Based-Map Matching Algorithm for Location based Service Applications in Urban Canyons", Sep. 2004.*

Philip Roper et al., "Data Collection Technology at ARRB Transport Research", Road Transp. Res; Road and Transport Research Mar. 2004, vol. 13, No. 1, XP009096933, pp. 88-91.

Seth Rogers, "Creating and Evaluating Highly Accurate Maps with Probe Vehicles", Oct. 1, 2000, Intelligent Transportation Systems, 2000, Proceedings, 2000 IEEE Oct. 1-3, 2000, XP010520527, pp. 125-130.

International Search Report dated Mar. 14, 2008, from corresponding PCT application.

* cited by examiner

- Road management static processing, signalling errors, ZAP ZUP collisions, logic followed, sector global coherence, position of crash barriers, URBAN ROUTES, PP dangers risks, V85% Vn...
- Uses vehicle family 1, n, any family, rain, snow, black ice, dirt, day, night, summer, winter...
- Attributes vertical and horizontal signalling, dangers, ZAP, ZUP, urban, prohibition, Vn, Vn rain, +10 +20 +30, V85, traffic, accidentology, adhesion, surfaces, water flow, protection, crack, usual climate, profile lengthwise, profile crosswise, traffic, slowing, accidentology, particularities, works, construction, flow...
- Geometry curve - slope - camber - uni - projecting and re-entrant angles - width - exposure - trajectories, heights, other noteworthy points, NAVTEQ & IGN correction...
1. Positioning Reference, route, PK, X, Y, Z, (WGS84) NAVTEQ TELEATLAS, IGN, top vision, remarkable point, signal, start of zone, end of zone, side junction, gyratory, perpendicular reference...

FIG 1

METHOD OF CONSTRUCTING A DIGITAL MODEL OF A ROUTE

The present invention concerns a method of constructing a digital model of a road, a method of determining an adaptive localised road algorithm (hereinafter referred to as ALA for short), and an implementation device.

Although the invention is not limited to this, navigation aid applications have experienced increasing success over the past years and have revealed significant requirements with regard to road applications.

The invention proposes a response to these requirements, whether it is a case of cartographical optimisation or road management, this comprising assistance in monitoring the state of roads, the detection of dangers, a driving aid for vehicle drivers with, for example, the generation of an alert in the case of an imminent dangerous situation (for example exceeding the limit of adhesion, an obstacle, etc).

It is a method that makes it possible to compare and then aggregate the available variables defining a road with the constraints of an application and the constraints of the process and sequencing that are associated with this application. This comparison can be established from existing databases, using data coming from data recording and capture vehicles, from data coming from road management centres and from onboard road cartography creation centres. The comparison makes it possible to validate the ability of a variable at one moment, in the light of all the available variables, to be aggregated with other variables to respond to a particular use in compliance with the process and sequencing constraints of a particular application. Aggregation of the variables makes it possible to determine adaptive localised road algorithms with regard to the application chosen. These algorithms are located at a portion of a road, they define dangers, risks and all types of information and characteristics of this road according to elements that vary regularly such as rain, water or the speed of a vehicle. The invention makes it possible to update, in real time, the values of the road algorithms thus obtained. In the context of a given application, new measurements, new variables, new empirical information or new processing operations change the aggregation of variables contained and therefore the impact, the precision and the confidence in the algorithm obtained and in the results issuing from its use. The invention also makes it possible, for a particular application, to determine the confidence and quality of the information that can be obtained with the existing variables and to suggest the processing operations or the additional information to be collected to increase the quality or confidence of this information. The invention also makes it possible, from the algorithms obtained, to calculate the precise value at a given moment of the real-time information.

The invention also relates to a device that can be connected remotely or be installed in a vehicle for recording and capturing road data, in road management, supervision and calculation centres, in a GIS (standing for Geographical Information System), or in a centre for creating road cartographies for onboard use, the said device producing adaptive localised road algorithms. The said algorithms being used by road managers and onboard navigation systems for knowing at a given moment the precise value and the location of a characteristic or risk.

At the present time there does not exist any system capable of determining a diversity of adaptive localised road algorithms from existing data or from information transmitted by the road management centres, or from data contained in GISs, or from data transmitted by the onboard cartography creation centres.

Measurements made by local authority lorries or by similar lorries used by service providers are known, providing TFCs (standing for Transverse Friction Coefficients) and LFCs (standing for Longitudinal Friction Coefficients), the results communicated to the local authorities are insufficient to finely apprehend the risks relating to adhesion, since these values have to be compared with the speed of the user vehicle and real-time climatic conditions. Each surfacing reacts in a particular way to a set of parameters. A single item of static information does not suffice to give information on the necessary dynamic aspect.

Digital cartographies are known published by companies such as NAVTEQ and TELEATLAS (registered trade marks), and the way in which the data are captured, with a single DGPS and cameras, and the way in which these data are shaped, it is found that all the information produced is static and does not help to describe the characteristics of the road, such as for example the cameras and the quality of the surfacing.

Failures in attempts at collecting qualitative information on the road from local authorities by these same cartography companies for navigation are known. The nature, the dynamics, the diversity and the heterogeneity of the information make it impossible to retranscribe onto a map through the state of the art.

The failure of the creation, at a European level, of a MAP and ADAS (standing for Advance Driving Assistance System) cartography is known, the protagonists have attempted to standardise the collection of safety information without taking account of the dynamic dimension of the road data.

It is known that it is impossible for the GISs used by local authorities to integrate dynamic and adaptive elements in the context of use.

Database management systems are known, and in particular that of the ORACLE leader (registered trade mark), which supply solutions for the extraction, fusion and management of databases but are not in a position to modulate the apprehension of a variable through its use and do not make it possible to compare and aggregate road data.

There therefore exists a need to propose an improved device and method for comparing the characteristics of variables with other variables with regard to an application of a process and its contingencies, and making it possible to aggregate the said variables, so as to be able to determine road algorithms for entering adaptive localised ADAS digital information on road navigation cartographies and to supply road managers with algorithms enabling them to apprehend, for a precise portion of road, characteristic elements of this road with regard to possible daily changes.

According to the prior art, there exists a constant prejudice in thinking that the information stored on GISs or in road databases is fixed and that the meaning of a variable is independent of its use of the process and sequencing constraints that accompany it. The invention overcomes this prejudice by recommending a system that can certainly use constant fixed variables but also providing an analysis of the incidence and performance of variables according to their intended use and the application and process and sequencing constraints.

According to one application the present invention is intended to enhance road cartographies intended for navigation with compatible information useful to ADAS applications in vehicles.

According to another application the present invention is intended for producing, for managers, road information that makes it possible to manage roads and their usage better.

Other aims and advantages will emerge during the following detailed description, which does not however have the aim of limiting the invention.

First it is stated that the present invention concerns a method of constructing a digital model of a road characterised by the fact that it comprises steps consisting of acquiring a first set of data relating to the geometry of the road by means of a differential global positioning system (DGPS), acquiring a second set of data relating to the geometry of the road by means of a hybridised inertial unit with a global positioning system (GPS), indexing the values of the said first and second sets of data by determining their confidence level, discarding the values of the said first and second sets of data below a predefined confidence level in order to obtain a first set and a second set of corrected data, and aggregating the data of the said first and second sets of corrected data in order to obtain the digital model of the road.

According to one of the preferred but non-limitative variants, the method is such that:
  it also comprises a refinement of the model obtained by data aggregation, the said refinement consisting of adding geometric reference points obtained by means of a topographical-precision differential global positioning system (TDGPS),
  acquisition of the first and second set of data takes place by movement of a measuring vehicle on the road,
  simultaneously with the acquisition of the second set of data, additional road characterisation data are acquired,
  the acquisition of additional data comprises video capture and the video signal or signals are processed so as to extract multi-dimensional characteristics of the road chosen from: the width of the roadway, the height of edifices, road-sign panels,
  data issuing from databases of road management centres are incorporated in the digital model.

The present invention also concerns a method of determining an adaptive localised road algorithm ALA for application to road cartography or management.

This method is such that:
  a—a digital model of a road is constructed using the construction method of the invention,
  b—a batch of influencing variables is chosen according to the application,
  c—the variables are indexed and then aggregated with the data of the digital model,
  d—a confidence level is determined for the values, variables and data of the digital model,
  e—the ALA algorithm is constructed if the confidence level and the availability of the variables is above predefined thresholds.

Preferably:
  steps b, c, and d are implemented in parallel using several ALA algorithm creation processes, the result of the process that confers the best confidence and availability compromise for variables in application of predefined precision constraint rules are chosen;
  if the confidence level is below the predefined threshold, the missing variables are determined in order to reach the threshold and steps b, c, d are reiterated by incorporating the said variables,
  a complex ALA algorithm is created by associating a plurality of ALA algorithms obtained by steps a, b, c, d, e,
  the ALA creation process used for steps b, c, d is chosen from knowledge interrogation, knowledge extraction, behaviour cloning, optimisation under constraints, process identification, reverse problem resolution, the determination of precursors, the search for cause-and-effect links, the search for factors influencing consequences, analysis of interaction between variables, analysis of correlation between variables and rejection of aberrations,
  the application of the ALA algorithm is the determination of one or more of the following items of information: the localised adaptive transverse friction coefficient, the localised adaptive braking distance, the localised adaptive acceleration distance, the localised adaptive approach distance, the adaptive positioning of the target paths of the vehicles, the adaptive precursor of the adaptive location of the protection means, the adaptive localised information on the road geometry dangers, the adaptive localised information on the highway code dangers, the adaptive precursor of the creation of accident black spots, the adaptive water accumulation location, and the adaptive visibility location,
  the determination of the ALA algorithm is effected by means of a circuit of the in situ programmable gate array type for processing highly parallel data,
  the determination of the ALA algorithm is effected by a formal neural network,
  the determination of the ALA algorithm is effected by genetic algorithms.

The accompanying drawings are given by way of example and are not limitative of the invention. They represent one embodiment of the invention and will make it possible to understand it easily.

FIG. 1 gives an extract of the non-limitative look-up table between certain layers and grouping together the data and the type of data that constitute them, the data according to the layers may be data that are the results of processing operations or simple ingredient data.

FIG. 2 explains the positioning of the method with regard to the connection with the data sources.

Figure 2:
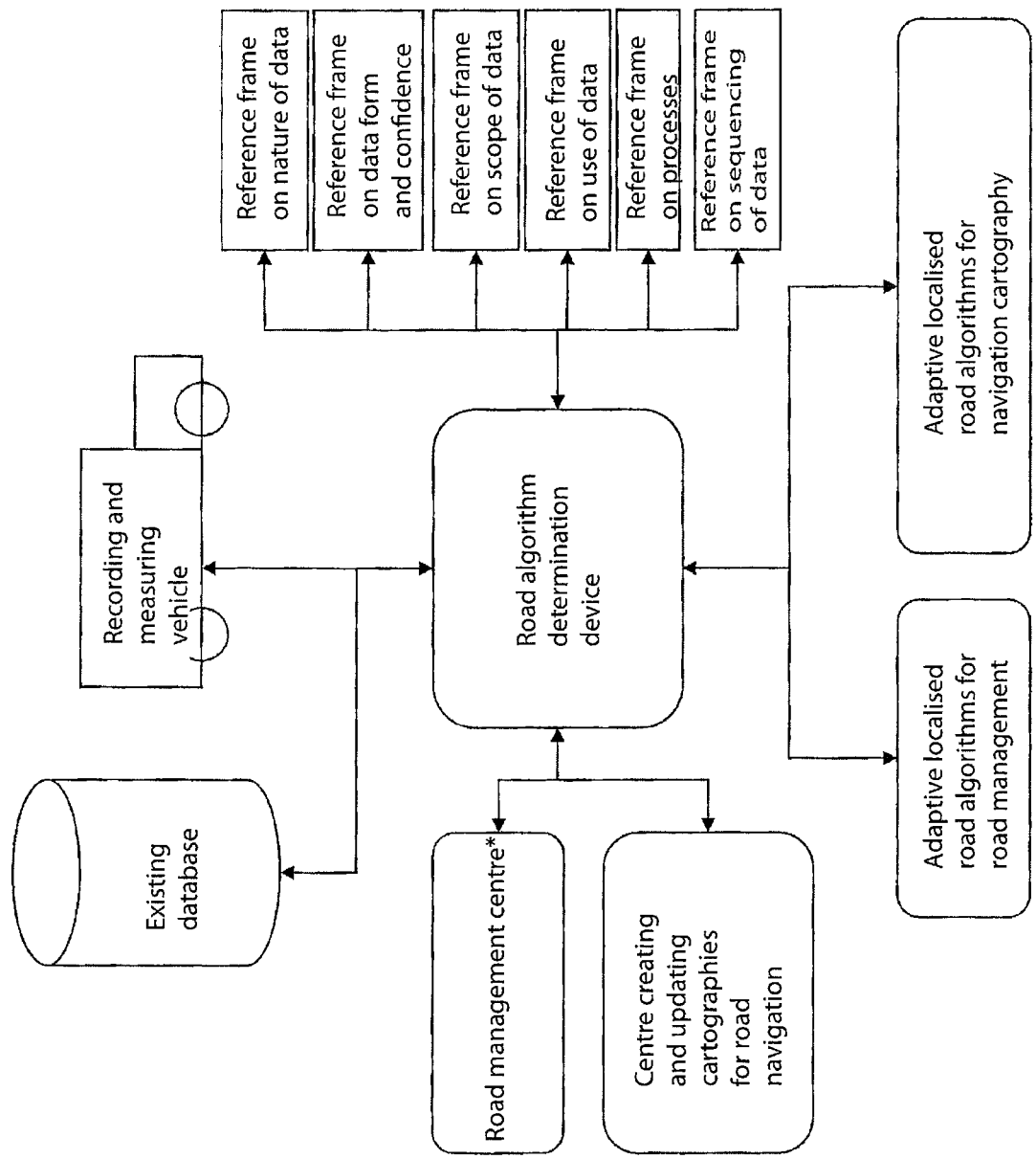
Figure 3:
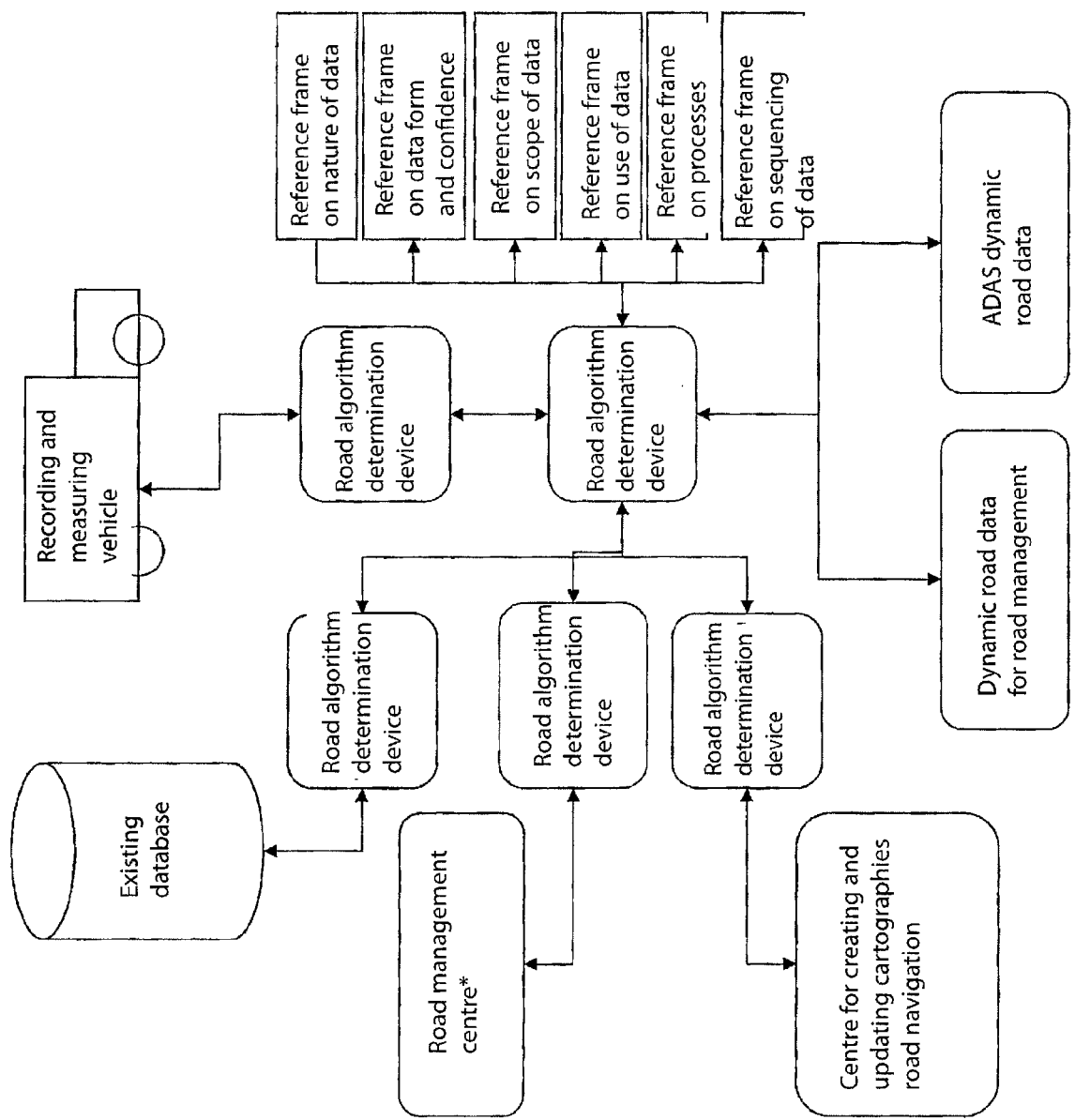
FIG. 3 illustrates the possibility of restarting, separating or dividing the method or device.
Figure 4:
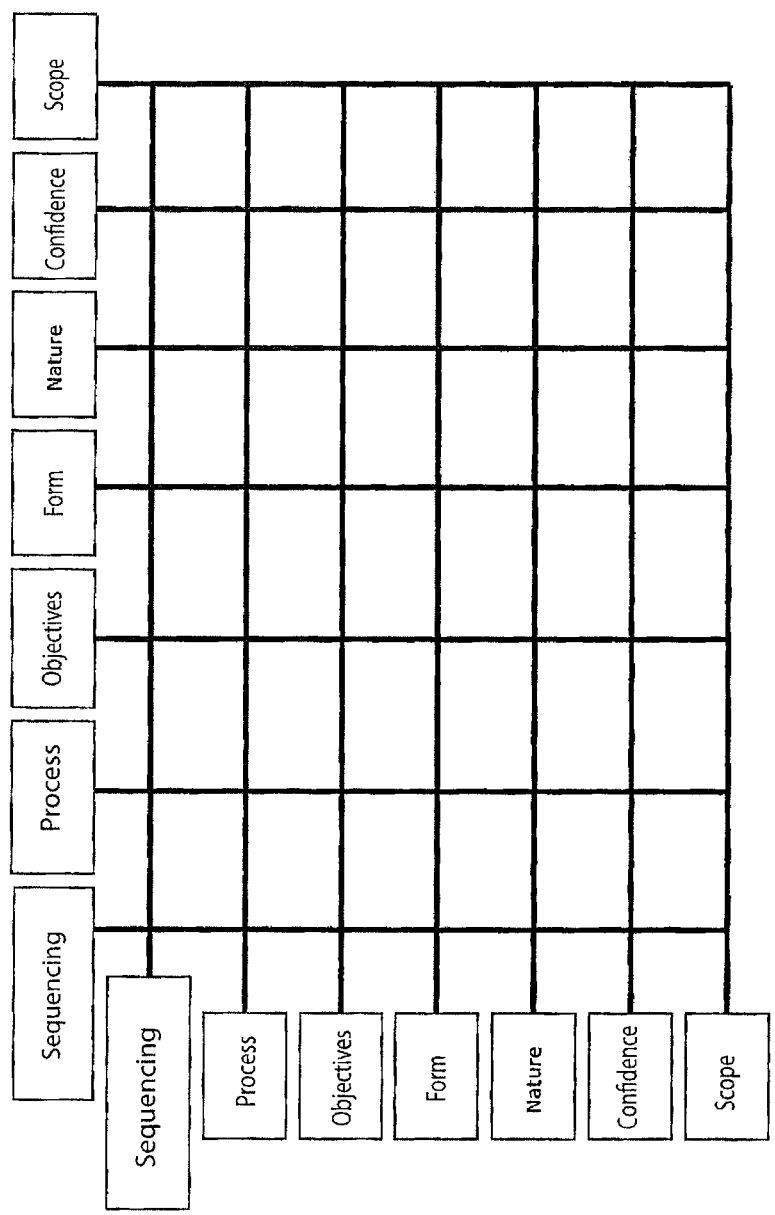
FIG. 4 shows schematically the way in which the macro-data are put in relationship with regard to the matrix structure of an FPGA.
Figure 5:
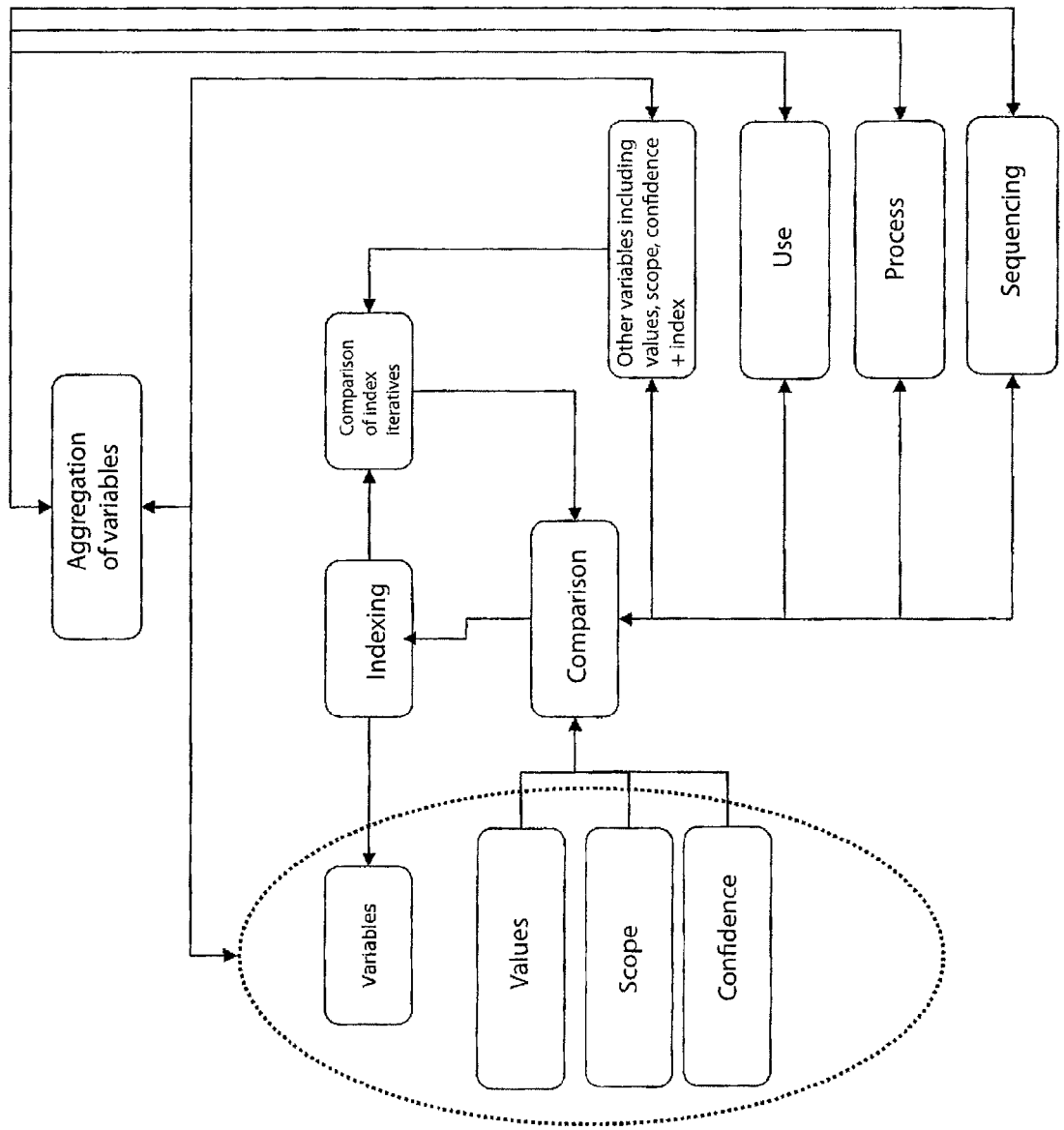
FIG. 5 shows the link between the various steps of the method and the determination of the algorithms.
Figure 6:
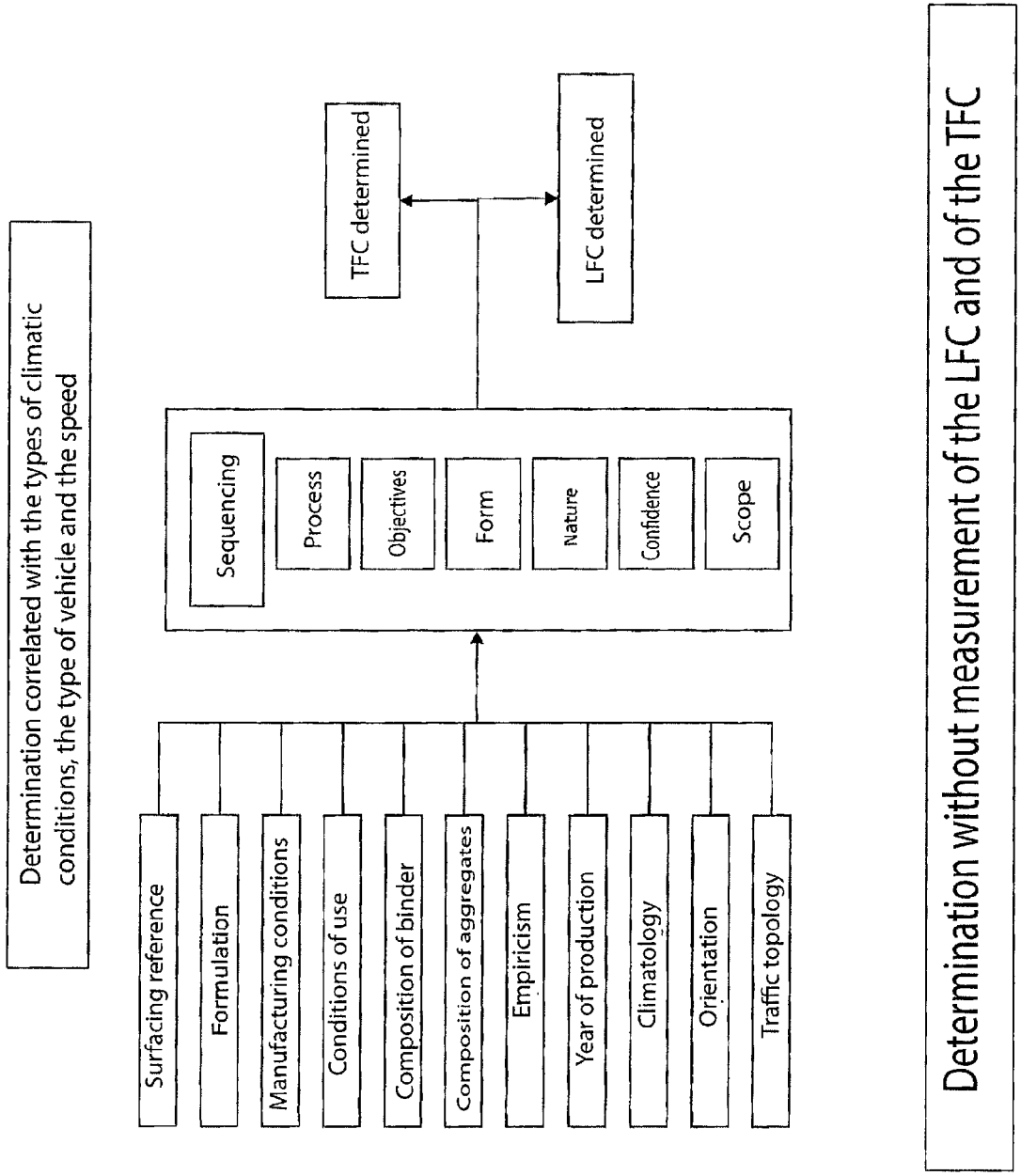
FIG. 6 illustrates the variety of belonging and sources of information available when it is wished to proceed with the determination of the LFCs and TFCs without using terrain measurement captures.
Figure 7:
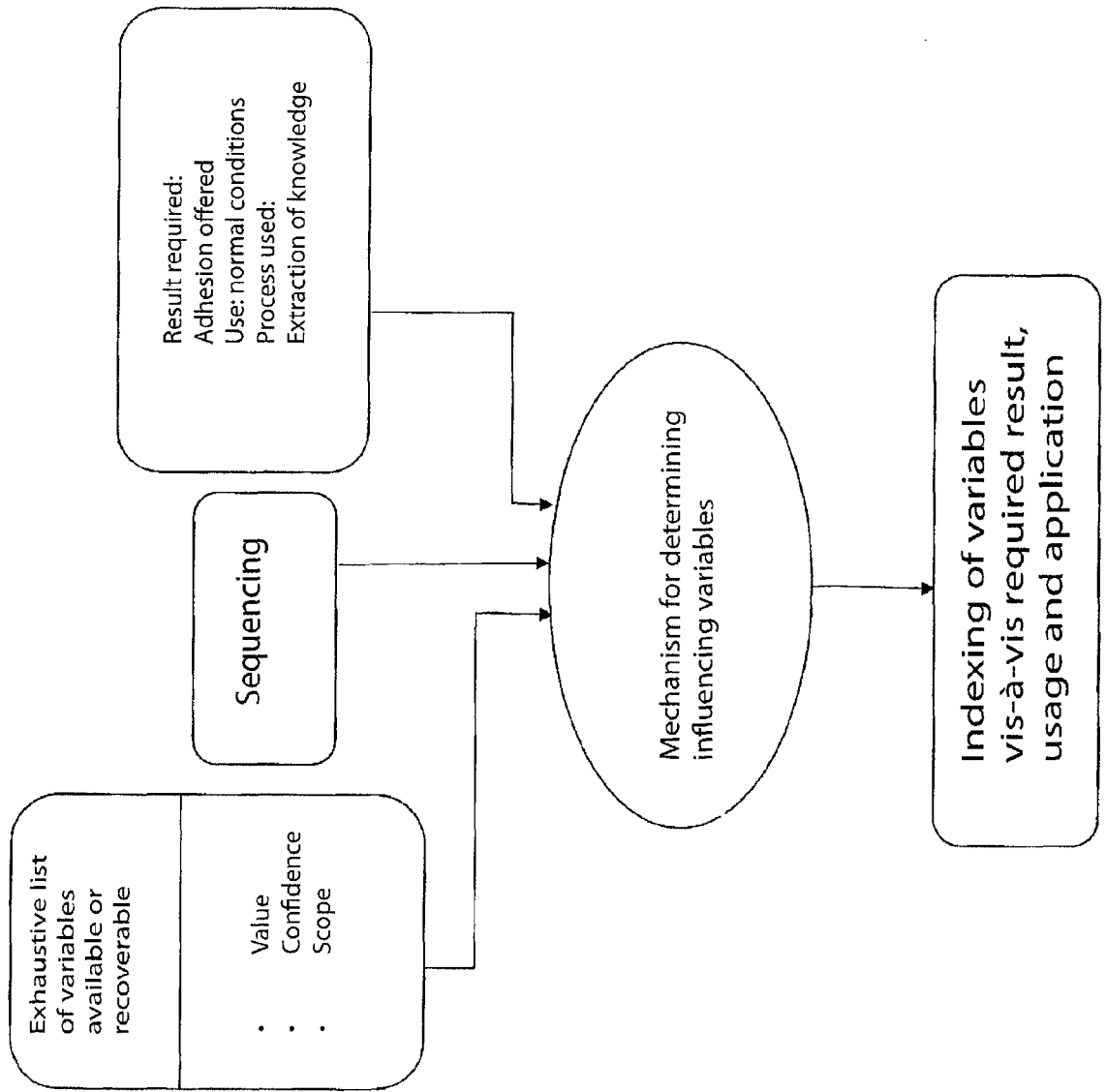
Figure 8:
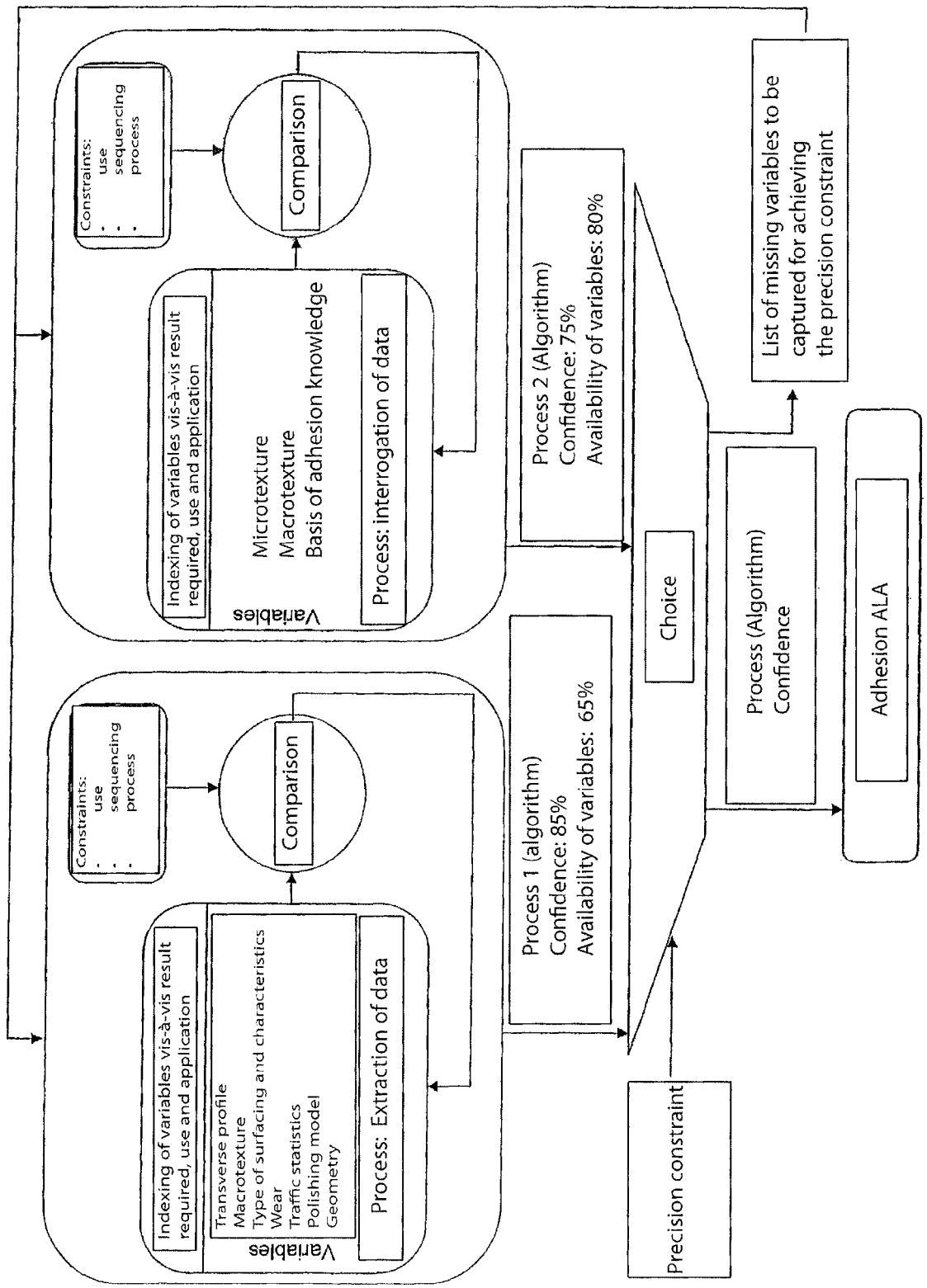

FIGS. 7 and 8 are other diagrams of the steps of the method of the invention for the purpose of determining an ALA here for evaluating the adhesion of a road. The determination function of the method in real-time scans each "value, scope, confidence" of all the data or sequences of data and analyses their conjoint influence on the required result in a given usage for a previously determined process. The results of this exploratory phase are indexed and stored in the indexing table relating to the process and sequencing.

Figure 9:
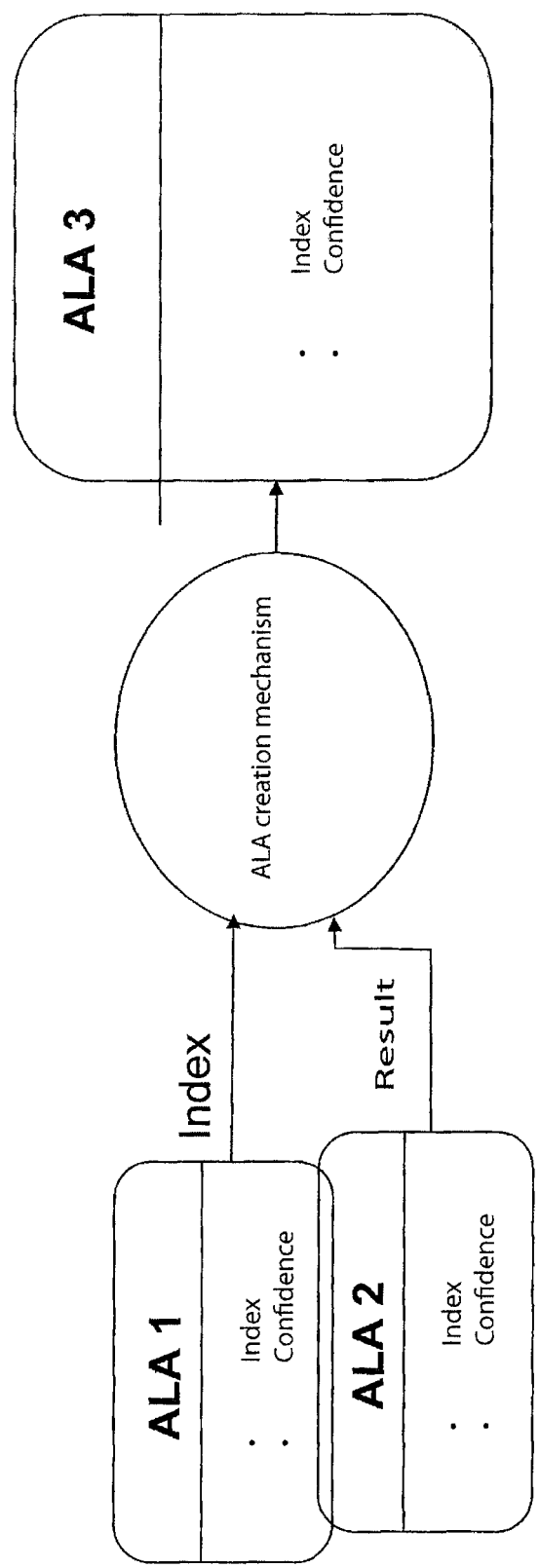

FIG. 9 illustrates the possibility of composing an ALA, here in principle as a complex ALA, from several ALAs already determined. According to this creation mechanism, either directly the output of the ALAs or the index created by other ALAs is recovered and used.

A few definitions of terms are given below for a good understanding of the remainder of the description:
  Scope of a variable: this is the form in which the information of the variable is contained.

Eg: dynamic variables, static variables, numerical variables, label variables, category variables, two-state variables, variables describing the configurations and the variables indexing the configurations.

Confidence: statistical quantity attributed to a value that quantifies its precision with regard to the capture parameters, the scope of the variable, its conjoint use with other variables. This value is expressed as a percentage.

Use: specific conditions in which the ALA is used.

Eg: class of vehicle, dry, damp, wet road etc.

ALA application: final functionality of the ALA

Eg: adhesion ALA, positioning ALA, frost ALA, etc.

Process: mechanism for creating the ALA

Eg: interrogation of knowledge, extraction of knowledge, optimisation, etc.

Sequencing: place where the data can be found.

Eg: the management of the secondary child databases, management of the index parent databases, management of the database versions, the equivalence of the geo-codings and the RPs (reference points of the road managers) and MPs (mile posts), integrity of the data, the information requested and the object data.

A first aspect of the invention consists of the creation of digital road models. The term road means any length of vehicle traffic way of any kind.

One example of the steps used is given below.

At the present time, onboard cartographies are composed of shape points and points of interest (POIs), which is not sufficient to develop onboard safety functions. It is therefore necessary to aggregate information relating to the geometry of the road in order to superimpose it on the existing cartography.

A problem is however posed, such ADAS functions require precision in the geo-location of the elements that no high-output capture service is able to supply currently.

The first step of creating ADAS dynamic road information for navigation cartography is to minimise these measurement location errors.

To do this the invention uses:
a DGPS device that is precise in absolute (sub-metric) terms but subject to losses of satellite signals (in gorges, wooded areas, towns, etc) and with a low refresh frequency;
a hybridised GPS inertial unit, which has lower precision than DGPS in absolute terms but which has great precision in relative terms (between two consecutive points) and a high refresh frequency.

The first step is to carry out an indexing of the values of these two trajectographs, which makes it possible to determine the confidence that can be attributed to each point, vis-à-vis the position of the satellites, the environment, values supplied by accelerometers, etc.

This indexing makes it possible to eliminate the aberrant values from the trajectographs, and two clean trajectographs are now therefore available, one precise in relative terms, the other in absolute terms.

Aggregation of these 2 trajectographs makes it possible to obtain a representation of the road in one dimension of high precision with a high refresh frequency.

This digitisation can be checked by the use of a topographical-precision DGPS that makes it possible to add reference points to the previous aggregation and thus reinforces the confidence granted to these location variables.

Each transformation undergone by the measuring points during their correction is recorded in order to be able to correct the geolocation of all the values supplied by the various sensors of the measuring device.

This part may also require resetting. This is because the sensors are disposed all over the capture lorry in the end we have only a single GPS trajectograph. A process has been set up to calculate the geolocation of each of the measurements from the position of the sensors in the lorry, the corrected trajectograph and the heading of the lorry.

The geolocations of the values are now available, which can be aggregated with information extracted from front and rear videos. For this purpose a process of automatic geolocation of the elements displayed on the videos and breakdown thereof in a database is set up.

This process is used here to locate the widths of the roadways, the heights of bridges, signs, etc. And therefore the values previously calculated on the road are reset, which makes it possible to digitise it in three dimensions.

To do this data are available relating to longitudinal profile, transverse profile and camber, roll, pitch and heading, minimum and mean radii of curvature, and narrowing, which are compared with the knowledge base for the geometry of the road and its effect on the vehicle in order to derive therefrom the information particular to the road with great confidence. Once this work is preformed, three-dimensional geometric plates are created, to which safety attributes can be attached.

Through this process of indexing, comparing and aggregation of variables, a digital model of the road is created in three dimensions, which will be the basis for all the ALA algorithms developed.

A significant application of the present invention consists of the determination of the risks caused by a road surface with regard to its state. French local authorities, just like councils or districts responsible for road management, do not have available, for all the roads that they manage, complete measurements giving the state of the surfacing. Some of these roads whose state is deemed to be critical are the subject of high, low and medium frequency level measurements by the infrastructure departments, and measurements of micro, macro and mega structure. These measurements are carried out in accordance with precise standards and the technical study and engineering centres responsible for executing them send local authorities reports specifying values with reference to these capture standards, with an associated comment. When they exist these reports are difficult use; how to determine the level of risk? How to decide whether or not it is necessary to repair the surfaces? The majority of the time these measurement reports moreover do not exist, and the local authority then decides to repair its roadways according for example to a 10-year rolling program that depends on the available budgets, without truly taking account of the wear or the actual unsuitability of the existing surface.

A series of chronological steps resulting in the creation of an ALA are indicated below by way of indication. A practical example applied to the adhesion is then detailed.

Chronology

Analysis of variables

1. Exhaustive list of variables available or recoverable with their scope and confidence.

2. Referencing of their sequencing.

Indexing for an application, use and given process

3. Determination of the required result and its use as well as the process of determining the ALA.

4. Determination of the variables influencing the required result according to the use and process.

5. Indexing of the result

Comparison

6. The indexed variables are compared with the constraints given by the use, process and sequencing.

7. Which makes it possible to determine, for each process and set of variables, a confidence and an availability of data.

Choice

8. Then n data confidence and availability values are obtained for each of the processes adopted. The choice algorithm will determine the most suitable solution with regard to the constraint of confidence, accessibility of variables and complexity of the ALA.

9. If no solution happens to satisfy the constraints, the missing variables are determined. Once these are indexed, the entire process is repeated.

Creation of the "Adhesion" ALA

FIGS. 7 and 8 show in detail phases of determining an ALA algorithm for an "adhesion" application that is not limitative of the invention.

The following data are used in this example:
Capture lorry:
DGPS trajectography
Inertial central hybridised GPS trajectography
Camber
Isolated deformations on the roadway
Widths and depths of right-hand and left-hand ruts
Sagging of verges
Transverse road profile
Longitudinal road profile
Macrotexture
Roll
Pitch
Heading
3-axis acceleration
Minimum and mean radii of curvature with type of narrowing (start of bend, end of bend, zero)
Front and rear videos
Adhesion:
Microtexture
Macrotexture
Adhesion offered
Drainability
Empiricism
Road manager data
Empiricism
Types of surfaces
Highway Department central laboratory
Empiricism
Models
Miscellaneous:
Environmental models A large number of data, variables, processes, applications or the like are used by the invention. The various aspects are stated or repeated below.

The steps of creating the ALA may comprise:
defining the nature of the data,
defining the form and confidence of the data,
defining the scope of the data,
defining the application that will use the data,
defining the process of processing the data,
defining the sequencing of the data associated with the application and process,
determining the adaptive localised road algorithms.

Preferably, this method is such that
the nature of the data is chosen from thematic data layers, the geometric layer, the positioning layer, the attribute layer, the usage layer, the dynamic layer, the road management layer and the onboard layer, some of the these layers being detailed in FIG. 1,
the form and confidence of the data is chosen from the measurement, the calculation, the adjustment of knowledge, the statistics, the empiricism, the belonging to a property and simulation, each of these forms having a specific confidence and stability definition,
the scope of the data is chosen from the dynamic variables, the static variables, the numerical variables, the label variables, the category variables, the two-state variables, the variables describing the configurations and the variables indexing the configurations,
the application is chosen from the road maintenance function, the road construction function, the road protection function, the road use function, the traffic guidance for particular routes, the description of the speed limits, the processing of the technical difficulties specific to the local territorial sub-divisions, the analysis of the accident black spots and critical sites and sheets, making itineraries consistent, description of surfaces with regard to user risks, processing of accidentology files, the creation of and ADAS layer for navigation cartography,
the process is chosen from the interrogation of knowledge, the extraction of knowledge, the cloning of behaviour, optimisation under constraints, process identification, the resolution of problems in reverse, the determination of precursors, the search for cause and effect links, the search for factors influencing consequences, analysis of the interaction between variables, analysis of correlation between variables, rejection of aberrations.
the sequencing of data is chosen from the management of secondary child databases, the management of index parent databases, the management of versions of database, the equivalence of geo-coding and RPs and MPs, data integrity, information on request and object data, objective data information gateways, virtual supervision and the data destination origin,
the adaptive localised road algorithms are chosen from the transverse-friction localised adaptive coefficient, the longitudinal-friction localised adaptive coefficient, the localised adaptive braking distance, the localised adaptive acceleration distance, the localised adaptive approach distance, the adaptive positioning of the target paths of the vehicles, the adaptive precursor of the traffic saturation, the adaptive location of the prevention means, the adaptive location of the protection means, the adaptive localised information on the road geometry dangers, the adaptive localised information on the highway code dangers and priorities, the adaptive precursor of the creation of accident black spots, the adaptive water accumulation location, the adaptive visibility location,
the determination of the adaptive road algorithms is effected with all mathematical physical calculation means adapted to the given constraints,
the determination of the adaptive road algorithms is effected with an FPGA (Field Programmable Gate Array), which makes massively parallel calculations in real-time,
the determination of the adaptive localised road algorithms is effected with a formal neural network,
the determination of the adaptive localised road algorithms is effected with genetic algorithms,
the determination of the adaptive localised road algorithms is effected with genetic algorithms,
the determination of the adaptive localised road algorithms is effected with fuzzy logic algorithms,
it comprises a prior step of comparing the value, the scope and the confidence of the data or sequences of data with the other scope and confidence values of the other data with the application and the associated process and sequencing constraints, the determination function of the method scans in real time all the data or sequences of data issuing from the steps of definitions according to a technique described here but non-limitative, successively each "value, scope, confidence" of each data item or sequence of data is compared with the requirements of the use of the process and of the sequencing and the other scope and confidence values of each other data item or sequence of data, it comprises a second indexing step in which the results of the comparison are indexed and stored in the indexing table of the data item relating to the application, the process and the sequencing, it comprises a third step during which the other data take into account the reality of this new indexing and following their own comparison with the requirements of the use and of the process and the sequencing, are indexed in their turn, the mechanism is iterative and progressively balances for each road section and for each possible use, it comprises a fourth step, in which, in the light of the process, sequencing and use constraints, the combinations of data are determined, which are then termed variable, which afford the best responses and describe the pertinence and acceptability of the risk associated at response level with the particular conditions and the types of vehicle, the operator can request of the system the risk reduction alternatives, the latter will indicate the potentialities for improvement, for example reinforcing the confidence of such and such a family of data or add supplementary localised measures, in all cases the results of the processing operations will be integrated in the form of new variables, the values, scope and confidence of which can change following new processing operations inherent in the process, and will be defined according to the method of defining the previous steps and will be processed by the determination step, the result of the determination can be delivered in the form of an association of information, a crossed synthetic item of information, an algorithm, or an association of values, or a combination of the whole, the method of determining the data may be unique, distributed in several sub-methods, localised or carried out at a distance.

The present invention affords several revolutions in the daily routine of road managers, it first of all makes it possible to understand clearly the concept of complex, of systemic applied to each thematic, makes it possible in this precise example to establish an inventory of all the available data relating to the adhesion offered (LFC and TFC), it makes it possible to understand which associations of data can produce relevant information and which are the databases that are crucial.

For example, the characteristic of the aggregate that makes up the surfacing will impact on the rate of polishing of the said surfacing: according to the topology of the aggregate used locally, it will be possible to know and associate the age and the type of traffic and exposure, for certain other harder aggregates that do not polish or only little, the constitution and the method and manufacture of the binder will have to be associated in order to determine the stability of fixing of the aggregates by the binder.

Another fundamental contribution apart from that of understanding, such an innovation gives road managers a tool for calling on the available data with regard to the problems that they have to resolve, the invention makes it possible to optimise knowledge in relation to information available and makes it possible to guide them in taking isolated, highly targeted site measures in order to take good maintenance decisions.

In the case of the risks inherent in the quality of the adhesion offered, the algorithms afford, in a way localised to each specific section of road, a given TFC LFC value adaptable to the speed of the vehicles, the type of traffic, the climate conditions and the geometry of the road.

The road manager will be able to relativise the intrinsic value of the LFC and TFC, for example a poor LFC will have no consequence in a bend taken slowly, but on the other hand an excellent TFC at low speed for a particular surfacing may prove to be dangerous in certain fast curves.

The number of case of use of the data and the variant combinations is such that the present method is essential for optimising the actions of road managers.

Such a method is applicable to many problems, the applications are listed above in the description of the steps.

Road navigation cartographers have an even more basic problem than road managers since they are not capable of taking into account many data and fundamental road characteristics. Such a method enables them to redefine the capture mode with regard to the ADAS requirements formulated by equipment manufacturers and by motor manufacturers. Such a method then enables them to aggregate the data thus obtained and to produce adaptable localised algorithms stored as attributes in their digital cartographies.

The invention claimed is:

1. A method of constructing a digital model of a road, said method comprising:

using an implementation device comprised of a differential global positioning system device and a hybridised inertial unit with a global positioning system (GPS) to execute the steps of acquiring, with the differential global positioning system device at a first refresh frequency, a first set of data relating to the geometry of the road, the differential global positioning system device (DGPS) being relatively precise as compared to the hybridised inertial unit in absolute terms as to a specific point, acquiring, with the hybridised inertial unit at a second refresh frequency which is greater than the first refresh frequency, a second set of data relating to the geometry of the road, the hybridised inertial unit being relatively precise as compared to the differential global positioning system device in relative terms between two consecutive points, indexing values of said first and second sets of data by determining their confidence level, eliminating the values of said first and second sets of data below a predefined confidence threshold in order to obtain a first set and second set of corrected data, and aggregating data of said first and second sets of corrected data in order to obtain the digital model of the road whose data refresh frequency is equal to the second refresh frequency.

2. The method according to claim 1, further comprising a refinement of the model obtained by aggregating data, said refinement consisting of adding geometric reference points obtained by means of a topographical-precision differential global positioning system (TDGPS).

3. The method according to claim 1, in which the acquisition of the first and second sets of data takes place by the movement of a measuring vehicle on the road.

4. The method according to claim 3, in which, simultaneously with the acquisition of the second set of data, additional road characterization data are acquired.

5. The method according to claim 4, in which
the acquisition of additional road characterization data comprises a video capture of at least one video signal, and
the at least one video signal is processed so as to extract multidimensional characteristics of the road chosen from: a width of the roadway, a height of edifices, and road signs.

6. The method according to claim 1, further comprising obtaining data issuing from road management centre databases and incorporating the obtained data in the digital model in addition to the data of the first and second sets of corrected data.

7. The method according to claim 2, in which the acquisition of the first and second sets of data takes place by the movement of a measuring vehicle on the road.

8. A method of determining at least one adaptive localized road algorithm (ALA) for a given application chosen among cartography and the management of roads, the method comprising:
using an implementation device comprised of a differential global positioning system device and a hybridised inertial unit with a global positioning system (GPS) to execute
step a) of constructing a digital model of a road using a construction method comprising:
acquiring, at a first refresh frequency, a first set of data relating to geometry of the road by means of the differential global positioning system (DGPS) device precise in absolute terms as to a specific point,
acquiring, at a second refresh frequency which is greater than the first refresh frequency, a second set of data relating to geometry of the road by means of the hybridised inertial unit with the global positioning system (GPS) precise in relative terms between two consecutive points,
indexing values of the said first and second sets of data by determining their confidence level,
eliminating values of the first and second sets of data below a predefined confidence threshold in order to obtain a first set and second set of corrected data,
aggregating the data of said first and second sets of corrected data in order to obtain the digital model of the road whose data refresh frequency is equal to the second refresh frequency;
step (b) of choosing influencing variables according to the given application;
step (c) of indexing the variables and then aggregating the indexed variables with the data of the digital model; step (d) of determining a confidence level for the values, variables and data of the digital model; and
step (e) of constructing the adaptive localized road algorithm (ALA) algorithm when the confidence level and availability of the variables are above predefined thresholds.

9. The method according to claim 8, further comprising:
constructing plural adaptive localized road algorithms (ALA), each adaptive localized road algorithm (ALA) constructed from an execution of the construction process, wherein executions of the construction process are performed in parallel, and
applying predefined precision constraint rules to the plural adaptive localized road algorithms (ALA) and choosing one adaptive localized road algorithm (ALA) from among the plural each adaptive localized road algorithms (ALA) according to results of the application of the predefined precision constraint rules.

10. The method according to claim 8, in which, when the confidence level is below the predefined threshold, additional variables are determined in order to reach a threshold and steps b, c, d are reiterated, incorporating said additional variables.

11. The method according to claim 9, in which a further adaptive localized road algorithm (ALA) is created by associating the plural adaptive localized road algorithms (ALA).

12. The method according to claim 8, wherein said steps b, c, and d are performed by implementing one of:
a knowledge interrogation, a knowledge extraction, a cloning of components, an optimization under constraints, an identification of processes, a reverse resolution of problems, a determination of precursors, a search for cause-and-effect links, a search for factors influencing consequences, an analysis of the interaction between variables, an analysis of correlation between variables, and a rejection of aberrations.

13. The method according to claim 8, further comprising using the adaptive localized road algorithm (ALA) application for determining one or more of the following items of information:
a localized adaptive coefficient of transverse friction, a localized adaptive braking distance, a localized adaptive acceleration distance, a localized adaptive approach distance, an adaptive positioning of the target paths of vehicles, an adaptive precursor of the adaptive location of the protection means, an adaptive localized information on the road geometry dangers, an adaptive localized information on the highway code dangers, an adaptive precursor for the creation of accident black spots, a adaptive water accumulation location, and an adaptive visibility location.

14. The method according to claim 8, in which the adaptive localized road algorithm (ALA) is determined by means of a circuit of the in-situ programmable gate array type for processing parallel data.

15. The method according to claim 8, in which the adaptive localized road algorithm (ALA) is determined by a formal neural network.

16. The method according to claim 8, in which the adaptive localized road algorithm (ALA) is determined by genetic algorithms.

17. The method according to claim 8, in which the adaptive localized road algorithm (ALA) is determined by fuzzy logic algorithms.

18. The method according to claim 9, in which, when the confidence level is below the predefined threshold, additional variables are determined in order to reach a threshold and steps b, c, d are reiterated, incorporating said additional variables.

19. The method according to claim 9, wherein steps b, c, and d are performed by implementing one of:
a knowledge interrogation, a knowledge extraction, cloning of components, an optimization under constraints, an identification of processes, a reverse resolution of problems, a determination of precursors, a search for cause-and-effect links, a search for factors influencing consequences, an analysis of the interaction between variables, an analysis of correlation between variables, and a rejection of aberrations.

20. A method of determining at least one adaptive localized road algorithm (ALA) for a given application chosen among cartography and the management of roads, the method comprising:

using an implementation device comprised of an implementation device comprised of a differential global positioning system device and a hybridised inertial unit with a global positioning system (GPS) to execute step a) of constructing a digital model of a road using a construction method comprising:

acquiring a first set of data, at a first refresh frequency, a relating to geometry of the road by means of a differential global positioning system (DGPS) precise in absolute terms as to specific individual points, acquiring a second set of data, at a second refresh frequency which is greater than the first refresh frequency, relating to geometry of the road by means of a hybridised inertial unit with a global positioning system (GPS) precise in relative terms between consecutive points, indexing values of the said first and second sets of data by determining their confidence level, eliminating values of the first and second sets of data below a predefined confidence threshold in order to obtain a first set and second set of corrected data, aggregating the data of said first and second sets of corrected data in order to obtain the digital model of the road whose data refresh frequency is equal to the second refresh frequency; and step (b) of choosing influencing variables according to the given application;

step (c) of indexing the variables and then aggregating the indexed variables with the data of the digital model;

step (d) of determining a confidence level for the values, variables and data of the digital model; and step (e) of constructing the adaptive localized road algorithms (ALA) when the confidence level and the availability of the variables are above predefined thresholds, comprising:

constructing plural adaptive localized road algorithms (ALA), each adaptive localized road algorithm (ALA) constructed from an execution of the construction process, wherein executions of the construction processes are performed in parallel;

applying predefined precision constraint rules to the plural adaptive localized road algorithms (ALA) and choosing one adaptive localized road algorithm (ALA) from among the plural each adaptive localized road algorithms (ALA) according to results of the application of the predefined precision constraint rules;

wherein when the confidence level is below the predefined threshold, additional variables are determined in order to reach a threshold and steps b, c, d are reiterated, incorporating said additional variables.

* * * * *

UNITED STATES PATENT AND TRADEMARK OFFICE
CERTIFICATE OF CORRECTION

PATENT NO. : 8,510,085 B2  Page 1 of 1
APPLICATION NO. : 12/446660
DATED : August 13, 2013
INVENTOR(S) : Fargas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 722 days.

Signed and Sealed this

Fifteenth Day of September, 2015

Michelle K. Lee
*Director of the United States Patent and Trademark Office*